(12) United States Patent
Hassan

(10) Patent No.: US 12,665,307 B2
(45) Date of Patent: Jun. 23, 2026

(54) CIRCULARLY POLARIZED ANTENNA ELEMENT WITH SEQUENTIALLY ROTATED FEEDING

(71) Applicant: Analog Devices International Unlimited Company, County Limerick (IE)

(72) Inventor: Mohamed Alaaeldin Moharram Hassan, Al Jizah (EG)

(73) Assignee: Analog Devices International Unlimited Company, Limerick (IE)

( * ) Notice: Subject to any disclaimer, the term of this patent is extended or adjusted under 35 U.S.C. 154(b) by 135 days.

(21) Appl. No.: 18/514,939

(22) Filed: Nov. 20, 2023

(65) Prior Publication Data

US 2025/0167454 A1 May 22, 2025

(51) Int. Cl.
*H01Q 9/04* (2006.01)

(52) U.S. Cl.
CPC .......... *H01Q 9/0428* (2013.01); *H01Q 9/045* (2013.01)

(58) Field of Classification Search
CPC ..... H01Q 9/0428; H01Q 9/045; H01Q 9/0414
See application file for complete search history.

(56) References Cited

U.S. PATENT DOCUMENTS 5,790,078 A * 8/1998 Suzuki .................. H01Q 1/247 505/201
6,114,997 A 9/2000 Lee et al.
6,466,171 B1 * 10/2002 Sherman ............. H01Q 9/0414 343/893
2011/0291902 A1 12/2011 Bafrooei et al.
2012/0212386 A1 8/2012 Massie et al.

FOREIGN PATENT DOCUMENTS

CN 104681980 A * 6/2015
CN 105703081 A 6/2016
CN 114024150 A * 2/2022 .............. H01Q 1/38

OTHER PUBLICATIONS

Extended European Search Report issued in European Patent Application No. 24212279.4, dated Apr. 1, 2025.
George et al., "Comparison of a Four Stage Sequentially Rotated Wideband Circularly Polarized High Gain Microstrip Patch Array Antennas at Ku-Band," IEEE 11$^{th}$ European Conference on Antennas and Propagation (EUCAP), 2017, in 5 pages.
Abdelaal et al., "Wideband Circularly Polarized Dielectric Resonator Antenna for GPS and GNSS Applications", IEEE 17$^{th}$ International Symposium on Antenna Technology and Applied Electromagnetics (ANTEM), Jul. 2016, in 2 pages.

(Continued)

*Primary Examiner* — Dieu Hien T Duong
(74) *Attorney, Agent, or Firm* — Knobbe, Martens, Olson & Bear, LLP

(57) ABSTRACT

Aspects of this disclosure relate to a circularly polarized antenna element and a feeding network coupled to circularly polarized antenna element. The feeding network can sequentially rotate a radio frequency signal. The feeding network includes a first delay line and a second delay line, where the first delay line and the second delay line are in different layers that are stacked with each other.

20 Claims, 6 Drawing Sheets

(56) References Cited

OTHER PUBLICATIONS

Akbari et al., "Sequential Feeding Networks for Subarrays of Circularly Polarized Patch Antenna", IEEE International Symposium on Antennas and Propagation (APSURSI), Jun.-Jul. 2016, pp. 587-588.

Kishk, A.A., "Application of Rotated Sequential Feeding for Circular Polarization Bandwidth Enhancement of Planar Arrays with Single-Fed DRA Elements", IEEE Antennas and Propagation Society International Symposium, Jun. 2003, pp. 664-667.

Srinivasan et al., "Single-layer wideband circularly polarized antenna array using sequential phase feed for C-band applications", Wireless Networks, Apr. 2020, 26: 4163-4172.

Qu et al., "Compact Sequential Feeding Network with Quadruple Output Ports and Its Application for Wideband Circularly Polarized Antenna", IEEE Access, Apr. 2018, vol. 6, pp. 31891-31898.

* cited by examiner

CIRCULARLY POLARIZED ANTENNA ELEMENT WITH SEQUENTIALLY ROTATED FEEDING

BACKGROUND

Technical Field

The disclosed technology relates to circularly polarized antennas.

Description of Related Technology

An antenna can transmit and/or receive radio frequency (RF) signals that propagate as electromagnetic waves through space. A radio transmitter can provide a signal to an antenna, and the antenna can radiate energy from the signal as radio waves. An antenna can receive an RF signal. The received RF signal can be processed by a radio receiver. Antenna can be used in a variety of wireless communication applications. Certain antennas can be circularly polarized and radiate an electric field that rotates with time and space.

SUMMARY OF CERTAIN INVENTIVE ASPECTS

The innovations described in the claims each have several aspects, no single one of which is solely responsible for its desirable attributes. Without limiting the scope of the claims, some prominent features of this disclosure will now be briefly described.

One aspect of this disclosure is an antenna apparatus that includes a circularly polarized antenna element and a feeding network configured to sequentially rotate a radio frequency signal. The circularly polarized antenna element includes a first pair of ports and a second pair of ports. The feeding network includes a first delay line, a second delay line connected to the first pair of ports, and a third delay line connected to the second pair of ports. The second delay line and the first delay line and the second delay line are in different layers that are stacked with each other. An antenna ground is positioned between and provides shielding between the first delay line and the second delay line. The first delay line is coupled between the second delay line and the third delay line.

Impedances of first delay line, the second delay line, and the third delay line can provide unequal power division to compensate for losses in branches of feeding network.

The circularly polarized antenna element can include a patch. The circularly polarized antenna element and the feeding network can be monolithically integrated.

Another aspect of this disclosure is an antenna apparatus that includes a circularly polarized antenna element and a feeding network. The circularly polarized antenna element includes four ports. The feeding network is coupled to the four ports and configured to sequentially rotate a radio frequency signal. The feeding network includes a first delay line and a second delay line. The first delay line and the second delay line are in different layers that are stacked with each other.

The antenna apparatus can include an antenna ground positioned in a layer between the first delay line and the second delay line. The antenna ground can provide shielding between the first delay line and the second delay line. The first delay line can include a strip line. The second delay line can include a buried microstrip.

At least a portion of the first delay line and at least a majority of the second delay line can be positioned within a footprint of the circularly polarized antenna element.

The circularly polarized antenna element and the feeding network can have a combined footprint of no greater than $0.5\lambda$ by $0.5\lambda$, where $\lambda$ is the wavelength at an operating frequency of the circularly polarized antenna element.

The antenna apparatus can include a third delay line. The first delay line can be coupled between the second delay line and the third delay line. The second delay line can be connected to a first pair of ports of the four ports, and the third delay line can be connected to a second pair of ports of the four ports. The second delay line and the third delay line can be in a same layer. The first delay line can provide a 180° delay, the second delay line can provide a 90° delay, and the third delay line can provide a 90° delay. Impedances of first delay line, the second delay line, and the third delay line can provide unequal power division to compensate for losses in branches of feeding network. The impedance of first delay line can be in a range from $20\Omega$ to $40\Omega$, the impedance of the second delay line can be in a range from $30\Omega$ to $50\Omega$, and the impedance of the third delay line can be in a range from $30\Omega$ to $50\Omega$.

The circularly polarized antenna element and the feeding network can be monolithically integrated.

The circularly polarized antenna element can include a patch. The circularly polarized antenna element can include a second patch that is stacked with and spaced apart from the patch.

Another aspect of this disclosure is a method of radio frequency signal transmission. The method includes sequentially rotating a radio frequency input signal with a feeding network to provide rotated versions of the radio frequency input signal to four ports of a circularly polarized antenna element, the feeding network comprising delay lines in stacked layers; and transmitting a circularly polarized radio frequency signal using the circularly polarized antenna element.

The sequentially rotating can include dividing power of the input radio frequency signal unevenly to compensate for losses in branches of feeding network.

Each of the four ports can receive a rotated version of the radio frequency input signal that is rotated 90° from respective rotated versions of the radio frequency input received at two adjacent ports of the four ports.

The circularly polarized antenna element can have an axial ratio of less than 4 for the transmitting, and the circularly polarized antenna element can have a return loss of less than −10 decibels for the transmitting.

For purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

BRIEF DESCRIPTION OF THE DRAWINGS

Embodiments of this disclosure will be described, by way of non-limiting example, with reference to the accompanying drawings.

block diagram of a multi-turn magnetic sensing system that also includes angle sensing according to an embodiment.

Figure 5:
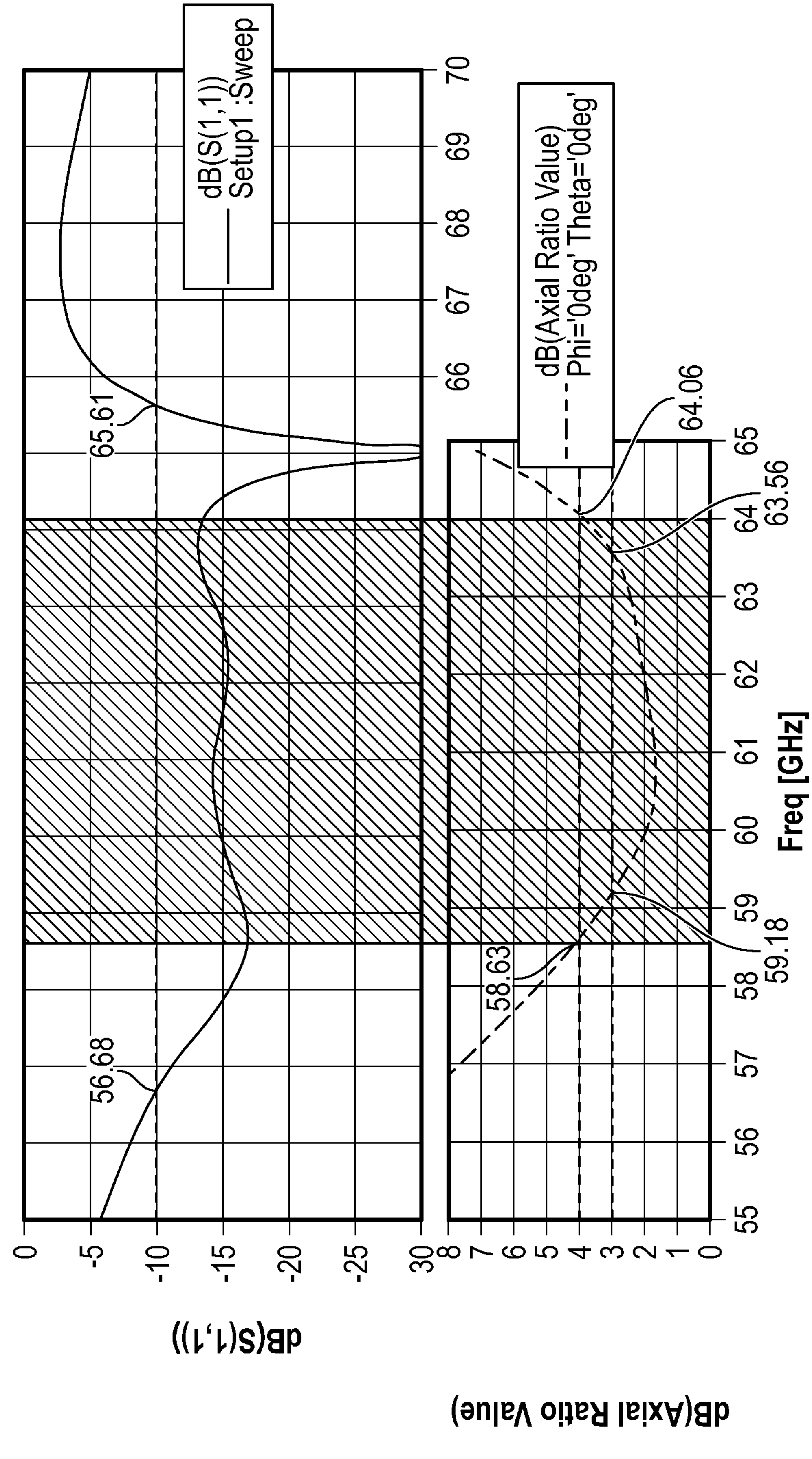

FIG. 5 includes graphs for matching and axial ratio for a circularly polarized antenna element and feeding network according to an embodiment.

Figure 6:
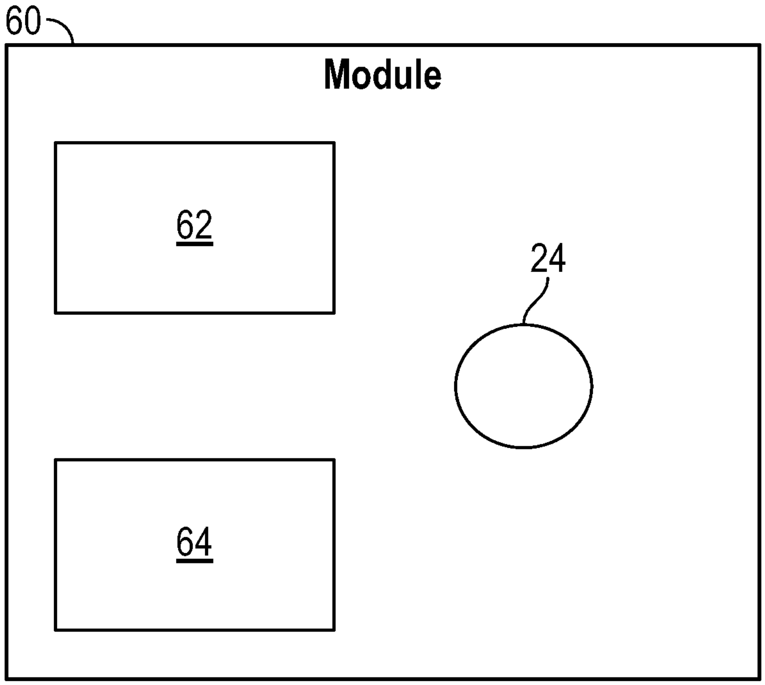

FIG. 6 is a schematic block diagram of a packaged module with a circularly polarized antenna element according to an embodiment.

DETAILED DESCRIPTION OF CERTAIN EMBODIMENTS

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the illustrated elements. Further, some embodiments can incorporate any suitable combination of features from two or more drawings.

Aspects of this disclosure relate to a compact single element circularly polarized antenna and a corresponding feeding network. The circularly polarized antenna element can include four ports connected to delay lines of the feeding network. With circular polarization of the antenna element, link integrity can be maintained despite arbitrary orientation and/or relative rotation. The feeding network can be implemented with multi-layer stacking. Delay lines of the feeding network can be stacked with each other in different layers. Accordingly, the feeding network can be implemented within a compact footprint. Delay lines of the feeding network can be implemented to account for losses in hosting dielectric material. A monolithic process can be used to manufacture the circularly polarized antenna element and the feeding network. A circularly polarized antenna and feeding network according to embodiments disclosed herein can be implemented on a single printed circuit board.

In certain applications, circularly polarized antennas disclosed herein can be used for relatively short distance wireless links at millimeter wave frequencies. For instance, circularly polarized antennas disclosed herein can be used for wireless links at frequencies in a range from 50 gigahertz (GHz) to 100 GHz. Circularly polarized antenna elements disclosed herein can be used for wireless communications between a master module and a slave module. Such wireless communications can be full duplex communications.

Antennas disclosed herein can be used for wireless communications in wide variety of applications, including but not limited to communications with robots or portions thereof such as robotic arms, communications with rotating cameras, other industrial applications, communications between train wagons, communications between a vehicle and a trailer, communications between a vehicle and a rotating camera, other vehicular and/or automotive applications, or the like.

For circular polarization, a radiated electric field rotates with time and space. Both x and y lateral components of the radiated electric field can be present. The radiated electric field ε can be represented by Equation 1:

$$\mathcal{E}(z;t) = E_0(\hat{x}\cos(\omega t - k_0 z) \pm \hat{y}\sin(\omega t - k_0 z)) \quad \text{(Equation 1)}$$

In Equation 1, k0 represents wave number. For right hand circular polarization (RHCP), the y component of the electric field lags the x component. For left hand circular polarization (LHCP), the x component of the electric field lags the y component. Regardless of rotation of the electric field, an antenna can still receive a good signal.

For circular polarization, an axial ratio AR can be represented by Equation 2 in which a is a major radius and b is a minor radius of an elliptical envelope of the radiated electric field.

$$AR = 20\log\frac{a}{b} \quad \text{(Equation 2)}$$

The axial ratio can represent a quality of circular polarization. The smaller the axial ratio AR, the more circularly a wave is polarized. An axial ratio AR of 0 can represent the best circular polarization.

For circularly polarized antennas, both lateral components of electromagnetic (EM) waves are typically excited with a 90° phase shift. Wideband designs can involve exciting both lateral components of EM waves to generate the desired circular polarization. However, dual-fed antennas (e.g., 0°, –90° excitation with a T-splitter and a delay line) that satisfy wideband specifications can generate radiation that is usually tilted from a broadside direction. Also, the radiation characteristics (e.g., beam peak direction and axial ratio) can be impacted by the surroundings, such as ground size.

A full-sequential rotation feeding with 0°, –90°, –180°, –270° quad point excitation can be applied to a circularly polarized antenna. This can make the circularly polarized antenna less sensitive to its surroundings than a dual fed circularly polarized antenna. Conventional sequential rotation feeding circuitry can be relatively large and occupy a relatively large footprint. Such large sized feeding circuitry can be undesirable for compact designs. In feeding networks for antennas, using lossy substrate materials and/or other losses in the feeding network may introduce asymmetry in the quad point excitation scheme when delay lines are used to generate desired phases. A special treatment can be applied to improve the circular polarization performance for such lossy substrates.

This disclosure provides a feeding network and circularly polarized antenna element that occupies between 0.3λ and 0.5λ of lateral dimensions with axial ratio bandwidth of around 10%, where λ is the wavelength at an operating frequency of the antenna. The operating frequency of the antenna can be a frequency at which a RF wave is transmitted and/or received by the antenna. Multi-layer feeding networks of this disclosure can advantageously be implemented in a monolithic manufacturing process. Embodiments of this disclosure include a circularly polarized antenna element and a feeding network that are monolithically integrated.

The feeding networks disclosed herein can provide sequential rotation and be split into sections and stacked on different layers. In an embodiment, a 180° delay line section with impedance $Z_2$ can be implemented as a strip line below the antenna ground and a 90° delay line section with impedance $Z_1$ can be implemented as a buried microstrip above the antenna ground. The impedances $Z_1$ and $Z_2$ can provide power division that is unequal to compensate for losses in different branches in the feeding network.

Figure 1:
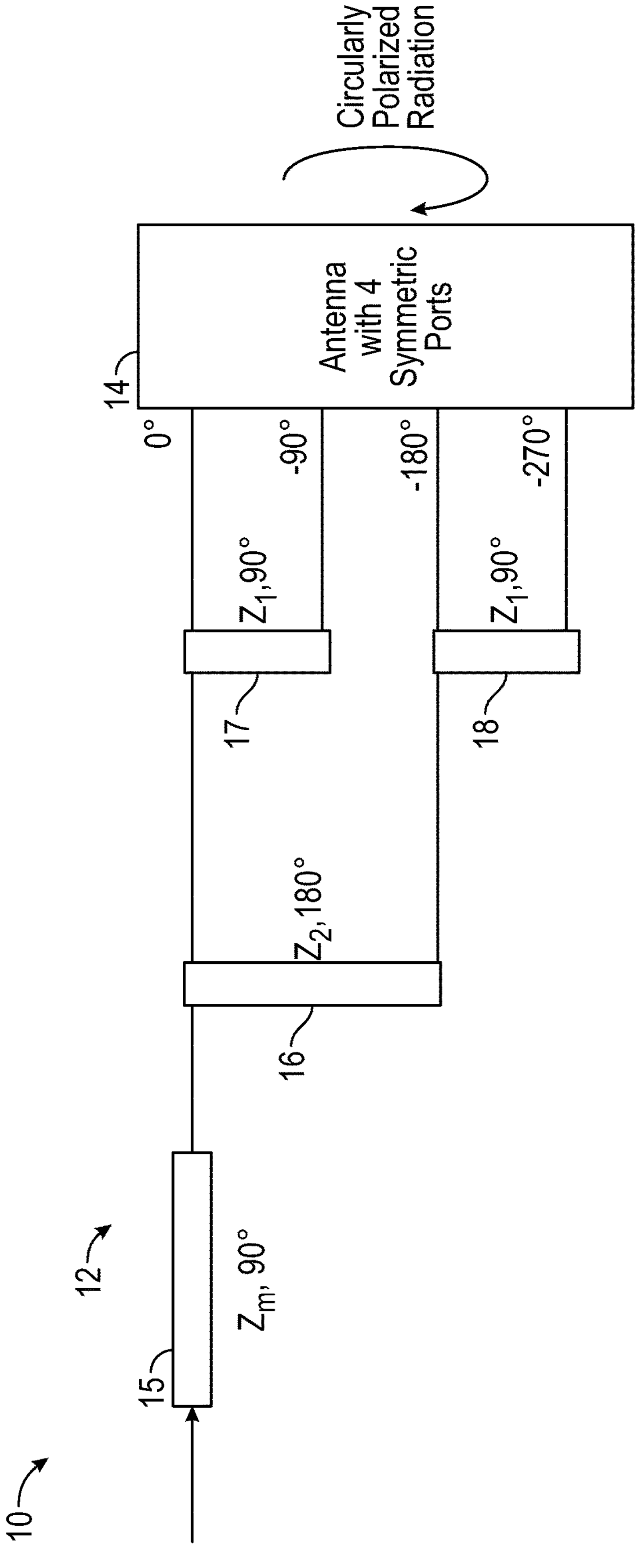
FIG. 1 is a schematic circuit diagram of a feeding network and a circularly polarized antenna element according to an embodiment.

FIG. 1 is a schematic circuit diagram of an antenna apparatus 10 that includes a feeding network 12 and a circularly polarized antenna element 14 according to an embodiment. The feeding network 12 can provide sequential rotation of an RF signal. For transmitting an RF signal, the feeding network 12 can provide four rotated versions of an RF input signal that include two pairs of signals that are 90° out of phase with each other where each pair of signals is 180° out of phase with the other pair of signals. Accordingly, the feeding network 12 can provide four RF signals with the following phases: 0°, −90°, −180°, and −270°. These four RF signals can be provided to four ports of the circularly polarized antenna element 14. The circularly polarized antenna element 14 can transmit a circularly polarized RF signal based on the signals provided at the four ports. The four parts can be positioned symmetrically about the circularly polarized antenna element 14. The feeding network 12 can also delay a received circularly polarized signal provided by the four ports of the circularly polarized antenna element 14 with the delay lines. The received RF signal can then be provided to receive circuitry.

As illustrated in FIG. 1, the feeding network 12 can include a matching delay line 15, a first delay line 16, a second delay line 17, and a third delay line 18. The matching delay line 15 can have an impedance Zm and delay an input RF signal by 90°. The matching delay line 15 can provide impedance matching. The first delay line 16, the second delay line 17, and the third delay line 18 can together provide sequential rotation of an RF signal. The first delay line 16 can have an impedance $Z_2$ and provide a 180° delay. The second delay line 17 is connected to one end of the first delay line 16, and the third delay line 18 is connected to the other end of the first delay line 16. Accordingly, the second delay line 17 can receive a RF signal that is 180° out of phase with an RF signal received by the third delay line 18. The second delay line 17 can have an impedance of $Z_1$ and provide a 90° delay. A first pair of ports of the antenna element 14 connected to opposite ends of the second delay line 17 can receive a pair of RF signals that are 90° out of phase with each other. The third delay line 18 can have an impedance of $Z_1$ and provide a 90° delay. A second pair of ports of the antenna element 14 connected to opposite ends of the third delay line 18 can receive a pair of RF signals that are 90° out of phase with each other. The first pair of ports of the antenna element 14 and the second pair of ports of the antenna element 14 can receive signals that are 180° out of phase with each other due to the first delay line 16.

The impedances $Z_1$ and $Z_2$ can create a power divider. The impedances $Z_1$ and $Z_2$ can provide unequal power division to compensate for power losses associated with paths to respective antenna ports of the circularly polarized antenna element 14. Example impedance values for $Z_1$ and $Z_2$ are provided below.

Figure 2:
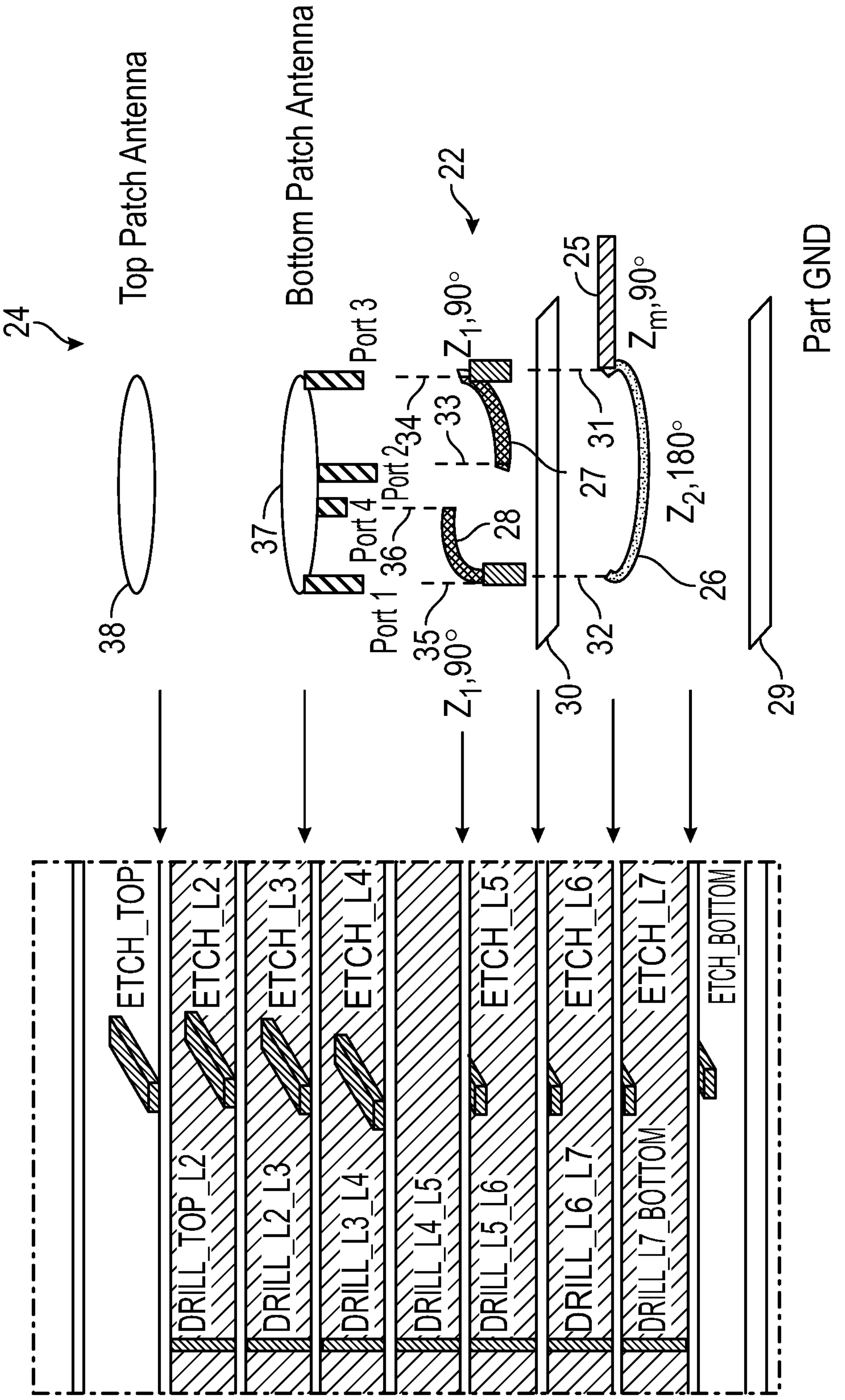
FIG. 2 is a schematic diagram of a layers of a feeding network that are vertically stacked with each other and a circularly polarized antenna element according to an embodiment.

FIG. 2 is a schematic diagram of a layers of a feeding network 22 that are vertically stacked with each other and a circularly polarized antenna element 24 according to an embodiment. FIG. 2 also illustrates a metal stack that includes a plurality of metal layers and a plurality of vias in which elements of the feeding network 22 and the circularly polarized antenna element 24 are implemented. The combination of the feeding network 22 and the circularly polarized antenna element 24 occupy a compact area where delay lines of the feeding network 22 are located below and at least partly within the footprint of the circularly polarized antenna element 24. This utilizes the area below the circularly polarized antenna element 24 for delay lines of the feeding network 22. In certain embodiments, the feeding network 22 and the circularly polarized antenna element 24 have a combined footprint of no greater than 0.5λ, by 0.5λ. In some embodiments the combined footprint is in a range from 0.3λ by 0.3λ to 0.5λ by 0.5λ.

The feeding network 22 is an example of the feeding network 12 of FIG. 1. The feeding network 22 includes a matching delay line 25, a first delay line 26, a second delay line 27, and a third delay line 28. These delay lines can be referred to as feed lines. In certain embodiments, one or more of the delay lines 25, 26, 27, and 28 can include one or more meanders.

As illustrated in FIG. 2, a matching delay line 25 and a first delay line 26 are located in a layer over a part ground plane 29. The part ground plane 29 can be implemented in a bottom layer of the metal stack of FIG. 2. The matching delay line 25 and the first delay line 26 can be located in layer 7 of a metal stack of FIG. 2. The matching delay line 25 can have an impedance Zm and delay an RF signal by 90°. The first delay line 26 have an impedance $Z_2$ and provide a 180° delay. In some applications, the first delay line 26 can provide a delay that is in a range from 170° to 190°, such as in a range from 175° to 185°. The first delay line 26 can be a strip line. The first delay line 26 is a conductive transmission line.

An antenna ground 30 can be located in a layer between the first delay line 26 and the second delay line 27. The antenna ground 30 can be located in layer 6 of the metal stack of FIG. 2. The antenna ground 30 can provide shielding between the first delay line 26 and the second delay line 27. The antenna ground 30 can also provide shielding between the first delay line 26 and the third delay line 28. The antenna ground 30 can provide a ground connection to the first, second, and third delay lines 26, 27, and 28, respectively.

The second delay line 27 is connected to one end of the first delay line 26 by way of a via 31 extending through antenna ground 30. The third delay line 28 is connected to the other end of the first delay line 26 by way of a via 32 extending through antenna ground 30. The second delay line 27 and the third delay line 28 can be in layer 5 of the metal stack of FIG. 2. The second delay line 27 and the third delay line 28 can be buried microstrip lines. These delay lines are conductive transmission lines. The second delay line 27 and the third delay line 28 can have an impedance $Z_1$ and provide a 90° delay. The second delay line 27 and the third delay line 28 can each provide half or approximately half of the delay provided by the first delay line 26. In some applications, the second delay line 27 and/or the third delay line 28 can provide a delay that is in a range from 80° to 100°, such as in a range from 85° to 90°.

Ends of the second delay line 27 are connected to a first pair of ports Port 2 and Port 3 of the circularly polarized antenna element 24 by way of vias 33 and 34. Ends of the third delay line 28 are connected to a second pair of ports Port 1 and Port 4 of the circularly polarized antenna element 24 by way of vias 35 and 36. The ports Port 1, Port 2, Port 3, and Port 4 of the circularly polarized antenna element 24 receive a fully sequentially rotated RF signal. Each port receives a signal that is 90° out of phase with signals at the two adjacent ports. The ports Port 1, Port 2, Port 3, and Port 4 can be positioned symmetrically about the circularly polarized antenna element 24, for example, as illustrated.

The circularly polarized antenna element 24 includes a bottom patch 37 and a top patch 38. For larger bandwidth, more spacing between the bottom patch 37 and the second and third delay lines 27 and 28, respectively, can be desired. As shown in FIG. 2, the bottom patch 37 and the second and third delay lines 27 and 28 are in non-adjacent layers with a layer therebetween. This can increase bandwidth relative to the bottom patch 37 being in a layer adjacent to the second and third delay lines 27 and 28. The bottom patch 37 can be in layer 3 of the metal stack of FIG. 2. The top patch 38 can be in layer 1 or a top layer of the metal stack of FIG. 2. Layer 1 can be the top layer of the metal stack as illustrated. The bottom patch 37 can be approximate the same area as the top patch 38.

The bottom patch 37 and the top patch 38 can be circular as illustrated. The bottom patch 37 and/or the top patch 38 can be any other suitable shapes, such as but not limited to elliptical, rectangular, square, or the like.

While FIG. 2 illustrates a circularly polarized antenna element 24 that includes a bottom patch 37 and a top patch 38, a circularly polarized antenna element can include a single patch in some embodiments. A patch antenna element with the feeding network 22 can be implemented in a monolithic process. Accordingly, the feeding network 22 and the circularly polarized antenna element 24 can be monolithically integrated. Any other suitable antenna element can be implemented with feeding networks disclosed herein.

If losses are negligible, impedance $Z_1$ of the second delay line 27 and the third delay line 38 can be 50Ω and impedance $Z_2$ of the first delay line 26 can be 25Ω for equal power division. The impedance $Z_1$ and the impedance $Z_2$ can be different than these values to compensate for losses. Branches of the feeding network 22 with more losses can be supplied with more power by varying the impedance $Z_1$ from 50Ω and/or by varying the impedance $Z_2$ from 25Ω. In some instances, impedances $Z_1$ and $Z_2$ can be determined using numerical optimization based on electromagnetic simulations. To compensate for losses in the feeding network 22, the impedance $Z_1$ can be in a range from 30Ω to 50Ω and the impedance $Z_2$ can be in a range from 20Ω to 40Ω, The impedance Zm can also be selected to compensate for losses associated with the feeding network 12. The impedance Zm can be in a range from 20Ω to 40Ω.

Figure 3:
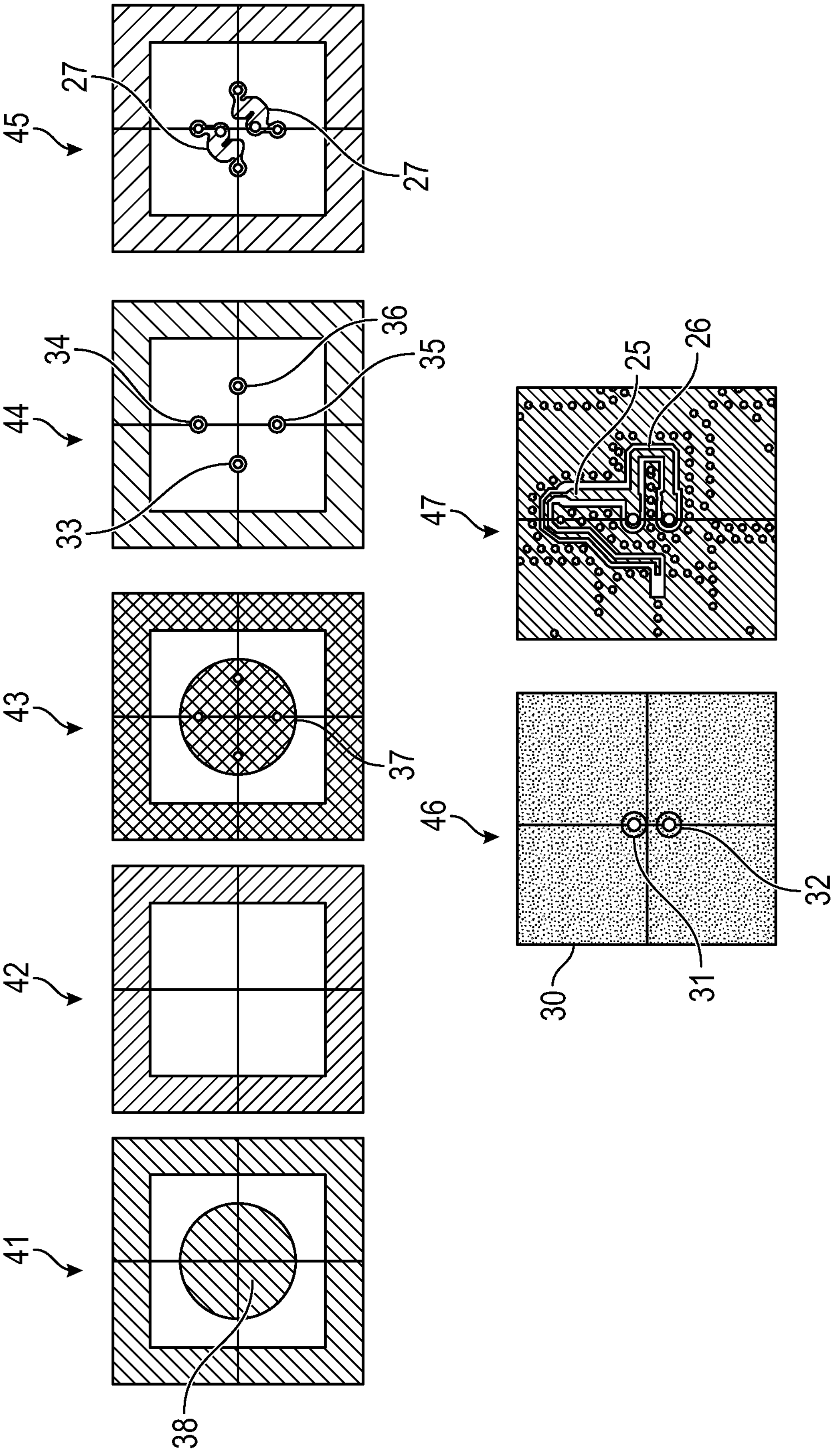
FIG. 3 includes schematic diagrams of different layers of an example layout of a circularly polarized antenna element and a feeding network according to an embodiment.

FIG. 3 includes schematic diagrams of different layers 41 to 47 of an example layout of the circularly polarized antenna element 24 and the feeding network 22 of FIG. 2 according to an embodiment. The layout of FIG. 3 has a 0.4λ×0.4λ footprint with a dielectric constant in a range from 2.5 to 4.

Referring to FIG. 3, the top patch 38 is included in a first layer 41. The top patch 38 can be spaced apart from bottom path 37 by dielectric material of a second layer 42. The bottom patch 37 can be included in a third layer 43. A first pair of ports of the bottom patch 37 can be connected to the second delay line 27 by way of vias 33 and 34 that extend from the third layer 43 through the fourth layer 44 to the fifth layer 45. A second pair of ports of the bottom patch 37 can be connected to the third delay line 28 by way of vias 35 and 36 that extend from the third layer 43 through the fourth layer 44 to the fifth layer 45. The fifth layer 45 includes the second and third delay lines 27 and 28. Sixth layer 46 includes antenna ground 30 with the vias 31 and 32 extending therethrough. The matching delay line 25 and the first delay line 26 are implemented in a seventh layer 47 in FIG. 3. The vias 31 and 32 connecting the first delay line 26 to second and third delay lines 27 and 28 extend from the seventh layer 47 to the fifth layer 45.

Figure 4:
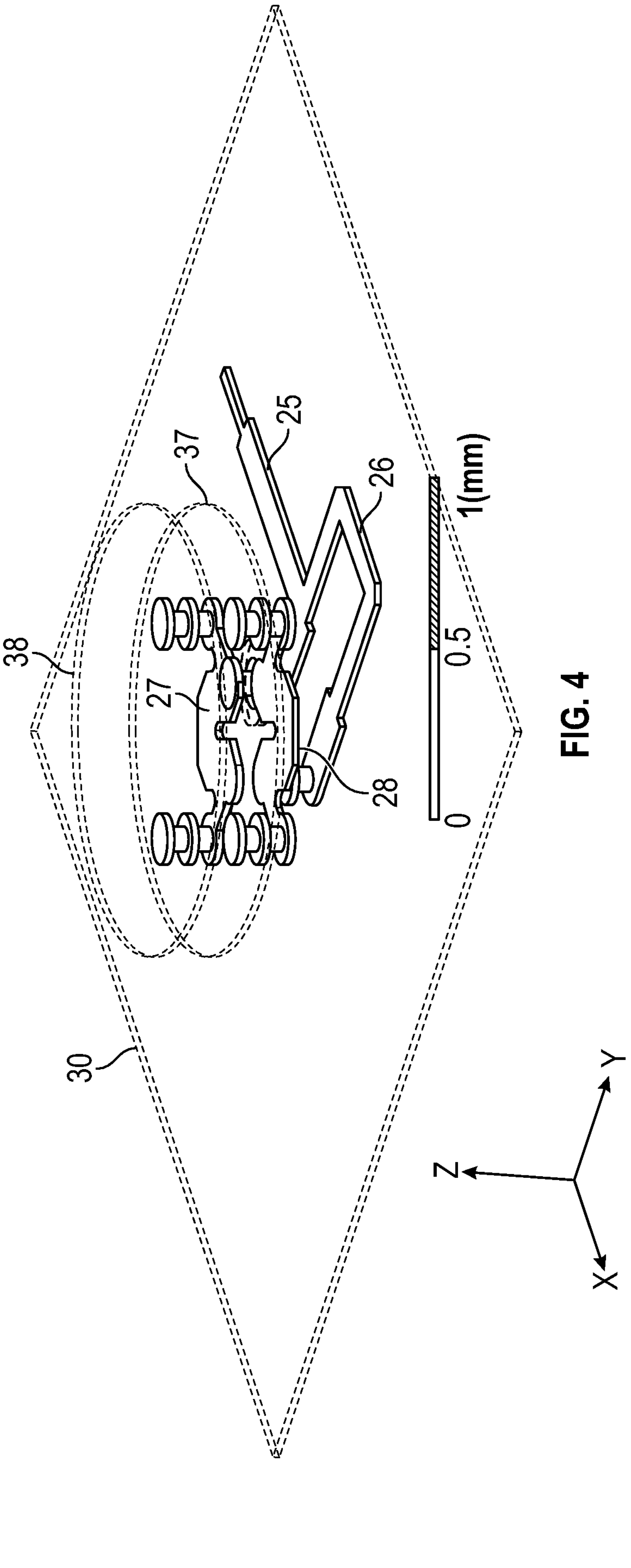
FIG. 4 is an example 3-dimensional schematic view of an antenna element and a feeding network according to an embodiment.

FIG. 4 is an example 3-dimensional schematic view of an antenna element 24 and a feeding network 22 of FIG. 2 according to an embodiment. FIG. 4 includes a scale to show the size of the example antenna element 24 and feeding network 22. As illustrated, at least a portion of the first delay line 26 and at least a majority of the second delay line 27 can be positioned within a footprint of the circularly polarized antenna element 24.

FIG. 5 includes graphs for matching and axial ratio for a circularly polarized antenna element and feeding network of FIG. 2 according to an embodiment. An axial ratio of less than 4 can be desired for certain applications. An axial ratio of less than 3 can be desired for some of these applications. The axial ratio value is plotted over frequency in the bottom graph of FIG. 5. The points where axial ratio is 4 and where axial ratio is 3 are indicated on this graph. The top graph of FIG. 5 is for matching and plots return loss over frequency. A return loss of less than −10 decibels (dB) can be desired for certain applications. FIG. 5 indicates desirable performance for an antenna apparatus that includes the circularly polarized antenna element 24 and the feeding network 22 for a frequency range from about 58.6 GHz to about 64 GHz where axial ratio is less than 4 and return loss is less than −10 dB.

FIG. 6 is a schematic block diagram of a packaged module 60 with a circularly polarized antenna element 24 according to an embodiment. The packaged module 60 can be a packaged radio frequency module. As illustrated in FIG. 6, certain packaged modules 60 can include a single circularly polarized antenna element 24. A feeding network in accordance with any suitable principles and advantages disclosed herein can be implemented under the circularly polarized antenna element 24. The module 60 an include integrated circuits 62 and 64. The integrated circuits 62 and 64 are co-packaged with the circularly polarized antenna element 24 in the packaged module 60. The integrated circuits 62 and 64 can provide any suitable circuit functionality. For example, the integrated circuit 62 can include radio frequency front end circuitry that is in communication with the circularly polarized antenna element 24. As another example, the integrated circuit 64 can include baseband processing circuitry. The packaged module 60 can include any other suitable circuitry for a particular application. For example, in some applications the packaged module 60 can include a test antenna (not illustrated) that is inactive during typical operation.

Although the packaged module 60 is illustrated with a single circularly polarized antenna element 24, an array of circularly polarized antenna elements in accordance with any suitable principles and advantages disclosed herein can be implemented in certain applications. As one example, in some applications, a 4 by 4 array of circularly polarized antenna elements can be implemented.

Antenna apparatus disclosed herein can be implemented in any suitable application that can benefit from a circularly polarized antenna. Any suitable principles and advantages disclosed herein can be implemented in systems, apparatus, and in methods that include a circularly polarized antenna. The principles and advantages described herein can be implemented in various apparatuses. Examples of such apparatuses can include, but are not limited to, consumer electronic products, parts of the consumer electronic products, electronic test equipment, vehicular electronic products, industrial electronic products, communications infrastructure such as wireless communications infrastructure, etc. Electronic products can include, but are not limited to, wireless communication devices, a mobile phone (for example, a smart phone), a hand-held computer, a tablet computer, a laptop computer, a wearable computing device, a vehicular electronics system, a radio, a wearable health monitoring device, base stations such as cellular base stations, access points, repeaters, relays, etc. Further, apparatuses can include unfinished products.

Unless the context clearly requires otherwise, throughout the description and the claims, the words “comprise,” “comprising,” “include,” “including,” and the like are to be construed in an inclusive sense, as opposed to an exclusive or exhaustive sense; that is to say, in the sense of “including, but not limited to.” The words “coupled” or connected”, as generally used herein, refer to two or more elements that may be either directly connected, or connected by way of one or more intermediate elements. Thus, although the various schematics shown in the figures depict example arrangements of elements and components, additional intervening elements, devices, features, or components may be present in an actual embodiment (assuming that the functionality of the depicted circuits is not adversely affected). Additionally, the words “herein,” “above,” “below,” and words of similar import, when used in this application, shall refer to this application as a whole and not to any particular portions of this application. Where the context permits, words in the Detailed Description using the singular or plural number may also include the plural or singular number, respectively. The words “or” in reference to a list of two or more items, is intended to cover all of the following interpretations of the word: any of the items in the list, all of the items in the list, and any combination of the items in the list. All numerical values provided herein are intended to include similar values within a measurement error.

Moreover, conditional language used herein, such as, among others, “can,” “could,” “might,” “may,” “e.g.,” “for example,” “such as” and the like, unless specifically stated otherwise, or otherwise understood within the context as used, is generally intended to convey that certain embodiments include, while other embodiments do not include, certain features, elements and/or states.

The teachings of the embodiments provided herein can be applied to other systems, not necessarily the systems described above. The elements and acts of the various embodiments described above can be combined to provide further embodiments. The acts of any methods discussed herein can be performed in any order as appropriate. Moreover, the acts of any methods discussed herein can be performed serially or in parallel, as appropriate.

While certain embodiments of the inventions have been described, these embodiments have been presented by way of example only, and are not intended to limit the scope of the disclosure. Indeed, the novel circuits, methods, and systems described herein may be embodied in a variety of other forms. Furthermore, various omissions, substitutions and changes in the form of the circuits, methods, apparatus and systems described herein may be made without departing from the spirit of the disclosure. For example, while the disclosed embodiments are presented in given arrangements, alternative embodiments may perform similar functionalities with different components and/or circuit topologies, and some elements may be deleted, moved, added, subdivided, combined, and/or modified. Each of these elements may be implemented in a variety of different ways. Any suitable combination of the elements and acts of the various embodiments described above can be combined to provide further embodiments. The accompanying claims and their equivalents are intended to cover such forms or modifications as would fall within the scope and spirit of the disclosure. Accordingly, the scope of the present inventions is defined by reference to the claims.

Although the claims presented here are in single dependency format for filing at the USPTO, it is to be understood that any claim may depend on any preceding claim of the same type except when that is clearly not technically feasible.

What is claimed is:

1. An antenna apparatus comprising:

a circularly polarized antenna element comprising a first pair of ports and a second pair of ports; and a feeding network configured to sequentially rotate a radio frequency signal, the feeding network comprising:

a first delay line;

a second delay line connected to the first pair of ports, wherein the second delay line and the first delay line are in different layers that are stacked with each other, wherein an antenna ground plane is positioned between and provides shielding between the first delay line and the second delay line, and wherein the antenna ground plane is a ground plane of the antenna apparatus positioned closest to the circularly polarized antenna element; and a third delay line connected to the second pair of ports, wherein the first delay line is coupled between the second delay line and the third delay line, wherein impedances of first delay line, the second delay line, and the third delay line provide unequal power division to compensate for losses in branches of feeding network.

2. The antenna apparatus of claim 1, wherein dielectric material extends from the second delay line to the circularly polarized antenna element.

3. The antenna apparatus of claim 1, wherein the circularly polarized antenna element comprises a patch, and wherein the circularly polarized antenna element and the feeding network are monolithically integrated.

4. The antenna apparatus of claim 1, wherein the circularly polarized antenna element comprises a patch and a second patch that is stacked with and spaced apart from the patch.

5. An antenna apparatus comprising:

a circularly polarized antenna element comprising four ports, a patch, and a second patch stacked with and spaced apart from the patch;

a feeding network coupled to the four ports and configured to sequentially rotate a radio frequency signal, the feeding network comprising a first delay line and a second delay line and a third delay line, the first delay line and the second delay line being in different layers that are stacked with each other, the first delay line coupled between the second delay line and the third delay line, wherein impedances of first delay line, the second delay line, and the third delay line provide unequal power division to compensate for losses in branches of feeding network; and an antenna ground positioned in a layer between the first delay line and the second delay line, the antenna ground providing shielding between the first delay line and the second delay line.

6. The antenna apparatus of claim 5, wherein the first delay line comprises a strip line, and the second delay line comprises a buried microstrip.

7. The antenna apparatus of claim 5, wherein at least a portion of the first delay line and at least a majority of the second delay line are positioned within a footprint of the circularly polarized antenna element.

8. The antenna apparatus of claim 5, wherein the circularly polarized antenna element and the feeding network have a combined footprint of no greater than 0.5λ by 0.5λ, where λ is the wavelength at an operating frequency of the circularly polarized antenna element.

9. The antenna apparatus of claim 5, wherein the second delay line is connected to a first pair of ports of the four ports, and wherein the third delay line is connected to a second pair of ports of the four ports.

10. The antenna apparatus of claim 9, wherein the second delay line and the third delay line are in a same layer.

11. The antenna apparatus of claim 9, wherein the first delay line provides a 180° delay, the second delay line provides a 90° delay, and the third delay line provides a 90° delay.

12. The antenna apparatus of claim 9, wherein dielectric material extends from the second delay line to the circularly polarized antenna element.

13. The antenna apparatus of claim 12, wherein the impedance of first delay line is in a range from 20Ω to 40Ω, the impedance of the second delay line is in a range from 30Ω to 50Ω, and the impedance of the third delay line is in a range from 30Ω to 50 Ω.

14. The antenna apparatus of claim 5, wherein the circularly polarized antenna element and the feeding network are monolithically integrated.

15. The antenna apparatus of claim 14, further comprising dielectric material between the patch and the second patch.

16. A method of radio frequency signal transmission, the method comprising:

sequentially rotating a radio frequency input signal with a feeding network to provide rotated versions of the radio frequency input signal to four ports of a circularly polarized antenna element, the feeding network comprising delay lines in stacked layers, wherein the sequentially rotating comprises dividing power of the radio frequency input signal unevenly to compensate for losses in branches of feeding network;

shielding, with an antenna ground plane, two of the delay lines in different layers of the stacked layers, wherein the antenna ground plane is a ground plane positioned closest to the circularly polarized antenna element; and transmitting a circularly polarized radio frequency signal using the circularly polarized antenna element.

17. The method of claim 16, wherein the feeding network and the circularly polarized antenna element are monolithically integrated, and wherein dielectric material extends from one of the delay lines to the circularly polarized antenna element.

18. The method of claim 16, wherein each of the four ports receives a rotated version of the radio frequency input signal that is rotated 90° from respective rotated versions of the radio frequency input signal received at two adjacent ports of the four ports.

19. The method of claim 16, wherein the circularly polarized antenna element has an axial ratio of less than 4 for the transmitting, and the circularly polarized antenna element has a return loss of less than −10 decibels for the transmitting.

20. The method of claim 16, wherein the circularly polarized antenna element comprises a patch and a second patch that is stacked with and spaced apart from the patch.

* * * * *